(12) United States Patent
Kashyap et al.

(10) Patent No.: US 6,987,909 B1
(45) Date of Patent: Jan. 17, 2006

(54) OPTICAL SYSTEMS AND ATHERMALIZED OPTICAL COMPONENT APPARATUSES AND METHODS FOR USE THEREIN

(75) Inventors: Raman Kashyap, Baie d' Urfe (CA); Andre Boudreault, Mascouche (CA); Robert A. Harmon, Woodbridge (GB); Irina A. Kostko, St. Petersburg (RU); Michael G. Martin, Baie d'Urfe (CA); Patricia Scarsella, Pincourt (CA); Feodor N. Timofeev, Lachine (CA); Pierre Tremblay, Pincourt (CA); Martin Vezina, Laval (CA); Claude Carignan, Beaconsfield (CA)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 10/305,042

(22) Filed: Nov. 26, 2002
(Under 37 CFR 1.47)

Related U.S. Application Data

(60) Provisional application No. 60/334,450, filed on Nov. 30, 2001.

(51) Int. Cl.
*G02B 6/34* (2006.01)
(52) U.S. Cl. .......................................... 385/37; 385/31
(58) Field of Classification Search ................. 385/15, 385/31, 37

See application file for complete search history.

(56) References Cited

U.S. PATENT DOCUMENTS

| | | | |
|---|---|---|---|
| 4,725,110 A | 2/1988 | Glenn et al. | |
| 4,807,950 A | 2/1989 | Glenn et al. | |
| 5,042,898 A | 8/1991 | Morey et al. | |
| 5,077,816 A | 12/1991 | Glomb et al. | |
| 5,327,515 A | 7/1994 | Anderson et al. | |
| 5,351,321 A | 9/1994 | Snitzer et al. | |
| 5,367,588 A | 11/1994 | Hill et al. | |
| 5,694,503 A | 12/1997 | Fleming et al. | |
| 5,703,978 A | 12/1997 | DiGiovanni et al. | |
| 5,745,617 A | 4/1998 | Starodubov et al. | |
| 5,757,540 A | 5/1998 | Judkins et al. | |
| 5,841,920 A | 11/1998 | Lemaire et al. | |
| 5,844,667 A | 12/1998 | Maron | |
| 6,044,189 A | 3/2000 | Miller | |
| 6,049,414 A | 4/2000 | Espindola et al. | |
| 6,087,280 A | 7/2000 | Beall et al. | |
| 6,101,301 A | 8/2000 | Engelberth et al. | |
| 6,108,470 A | 8/2000 | Jin et al. | |
| 6,181,851 B1 | 1/2001 | Pan et al. | |
| 6,356,683 B1 * | 3/2002 | Hu et al. | 385/37 |
| 2002/0172446 A1 * | 11/2002 | Fernald et al. | 385/12 |
| 2003/0012500 A1 * | 1/2003 | Oliveti | 385/37 |

* cited by examiner

*Primary Examiner*—Sung Pak

(57) ABSTRACT

An athermalized optical fiber component assembly including a limiting member, a mounting structure attached to the limiting member, a temperature compensating substrate attached to the mounting structure, and an optical fiber component mounted on the temperature compensating substrate. The movement of the temperature compensating substrate as a function of temperature is constrained by the limiting member. Also, a method for manufacturing an athermalized optical fiber component assembly.

20 Claims, 7 Drawing Sheets

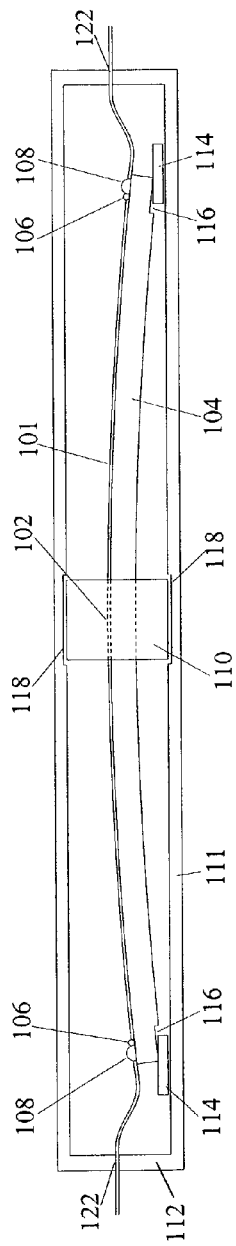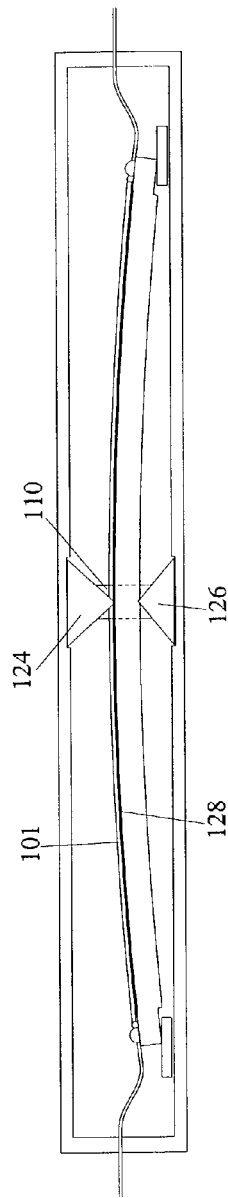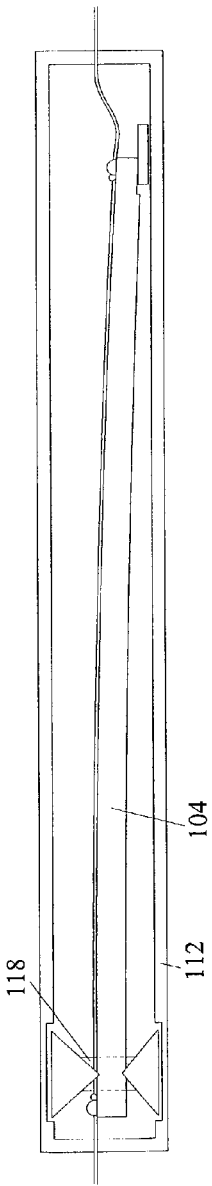

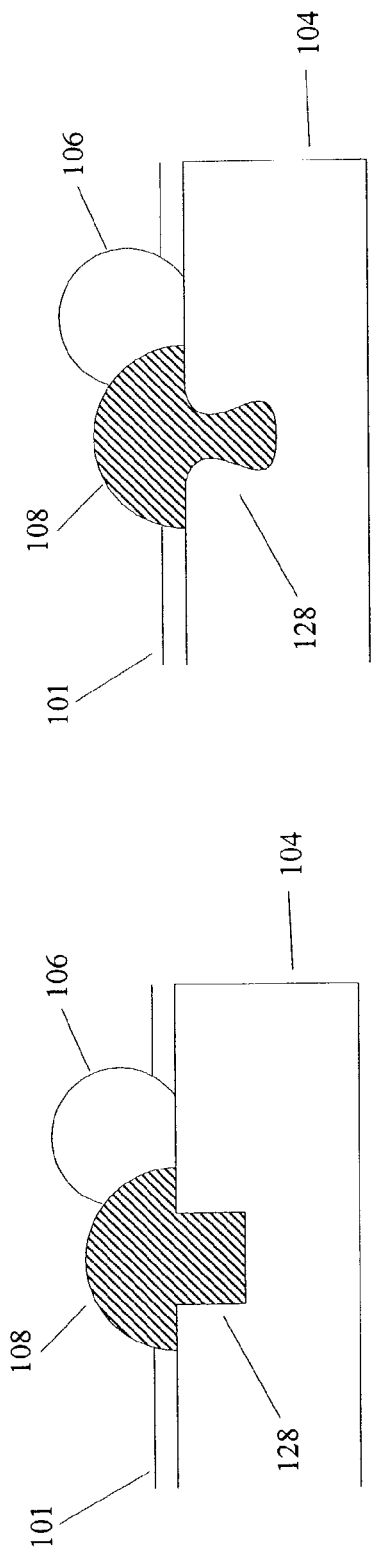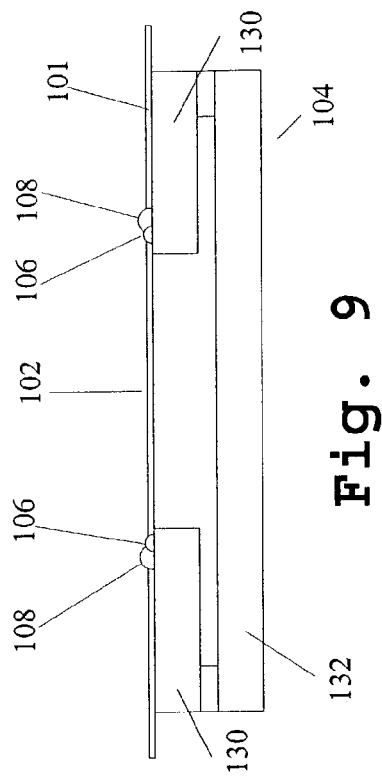

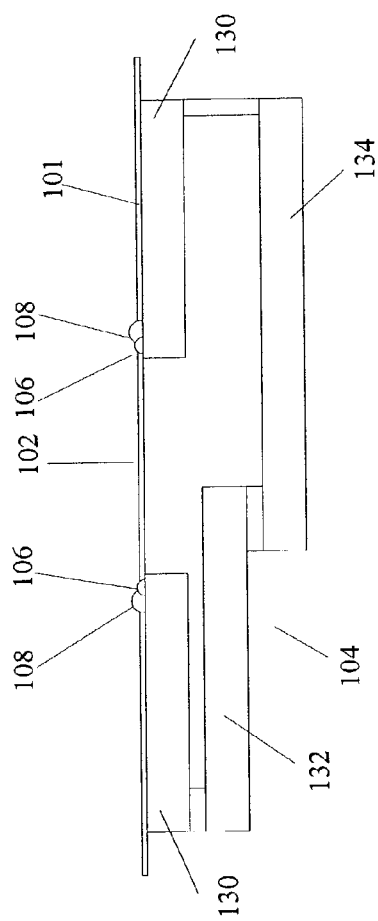
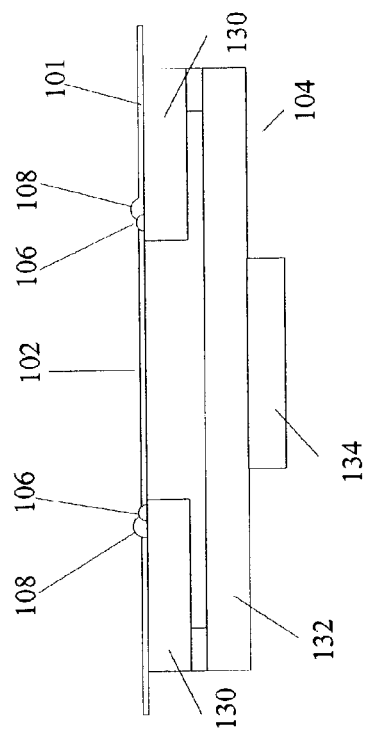

OPTICAL SYSTEMS AND ATHERMALIZED OPTICAL COMPONENT APPARATUSES AND METHODS FOR USE THEREIN

CROSS-REFERENCE TO RELATED APPLICATIONS

This application claims priority from U.S. Provisional Patent Application No. 60/334,450, filed Nov. 30, 2001, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical systems. More particularly, the invention relates to optical wavelength division multiplexing (WDM) systems and optical components employing athermalized optical components, especially Bragg gratings, and methods of making athermalized optical components for use therein.

WDM systems provide an effective means to increase the volume of data transmitted in optical systems. One difficulty that exists with WDM systems is that the various signal wavelengths often have to be separated for routing/switching during transmission and/or reception at the signal destination. In early WDM systems, the wavelength spacing was limited, in part, by the ability to effectively separate wavelengths from the WDM signal at the receiver. Most optical filters in early WDM systems employed a wide pass band filter, which effectively set the minimum spacing of the wavelengths in the WDM system.

Diffraction gratings were proposed for use in many early transmission devices; however, the use of separate optical components in free space configurations were cumbersome and posed problems in early applications. Likewise, etched optical fiber Bragg gratings, while an improvement over diffraction gratings, proved difficult to effectively implement in early operating systems.

Holograpically induced in-fiber Bragg gratings have become well known in the art. See, for instance, U.S. Pat. Nos. 4,725,110 and 4,807,950, which are incorporated herein by reference. Holographically induced Bragg gratings are generally produced exposing an optical waveguide, such a silica-based optical fiber or planar waveguide, to an interference pattern produced by intersecting radiation beams, typically in the ultraviolet frequency range. The intersecting beams can be produced interferometrically using one or more radiation sources or using a phase mask. For examples, see the above references, as well as U.S. Pat. Nos. 5,327,515, 5,351,321, 5,367,588 and 5,745,617, and PCT Publication No. WO 96/36895 and WO 97/21120, which are incorporated herein by reference.

The development of holographically induced in-fiber Bragg gratings has provided a versatile and reliable means to filter closely spaced wavelengths because the wavelength range, or bandwidth, over which the grating is reflective (reflection wavelength) as well as the reflectivity, can be controlled. The filter characteristics of in-fiber Bragg gratings has further improved the viability of dense WDM systems by enabling direct detection of the individually separated wavelengths. For example, see U.S. Pat. No. 5,077,816 issued to Glomb et al. But, one difficulty with Bragg gratings is that the reflection wavelength of the Bragg grating varies as a function of temperature. Specifically, the index of refraction and the length and spacing of the refraction index variations in the grating vary as a function of temperature resulting in a change in the reflection wavelength. In order to achieve high performance WDM systems, reflection wavelength stable Bragg gratings are necessary to allow deployment in a wide range of applications and locations encompassing a wide range of temperature environments.

Athermalization means the process of rendering something as completely independent of temperature or thermal affects. Different methods for athermalization of Bragg gratings have been disclosed. Active temperature control where the Bragg grating is heated and/or cooled has been disclosed, for example, see U.S. Pat. Nos. 6,044,189 and 6,087,280. Active control results in increased cost, weight, and complexity and reduced reliability. Additionally, feedback systems typically have to be included in active control systems to measure the performance of these devices during operation and to control the temperature to achieve the desired reflection wavelength. Again, this adds cost and complexity while reducing reliability. In order to overcome these problems, passive control systems have been developed. These systems use materials with coefficients of thermal expansion to change the strain on the Bragg grating to compensate for the effects of temperature. Various passive systems employ mounting the Bragg grating on a bimetal substrate that bends as a function of temperature resulting in convex and concave sides. Bimetal members are well known in the art. A bimetal member has two layers of metals with different coefficients of thermal expansion bonded together. The difference in the coefficients of thermal expansion causes the bimetal member to bend in one direction or the other depending on the temperature. Therefore, a Bragg grating mounted on the convex side of the bimetal substrate will be subject to a strain that varies as a function of temperature. The bimetal substrate can be designed to apply a strain as a function of temperature that compensates for the variation in the reflection wavelength as a function of temperature resulting in a constant reflection wavelength. Various patents describe passive athermalization of optical devices including U.S. Pat. Nos. 5,841,920, 5,844,667, 6,044,189, 6,087,280, 6,101,301, and 6,108,470.

While mounting a Bragg grating on a bimetal substrate can provide passive control of the reflection wavelength, temperature variations can fatigue the system, which decreases the reliability and lifetime of the system. For example, current techniques for attaching the Bragg grating to the substrate slip over time leading to improper strain on the fiber. Current attachment techniques can also lead to fiber breakage because of the movement due to temperature changes. For example, a fiber attached with a hard bond such as a hard epoxy may crack and eventually slip unless any difference in the coefficient of thermal expansion of the fiber 101 or the temperature compensating substrate 104 is accommodated for in the design. A hard attachment can also cause the fiber 101 to break, because as the fiber moves with the temperature compensating substrate 104 as the temperature changes, the fiber can be subject to sharp bending at the hard attachment point. Repeated temperature cycles can cause repeated sharp bending of the fiber at the attachment point resulting in the fiber breaking. On the other hand, if the fiber is attached with a soft bond, such as a soft epoxy, the fiber 101 can slip or move enough to affect the reflection wavelength of the Bragg grating 102. In addition, current passive athermalization techniques do not adequately compensate for non-linear variations in Bragg grating reflection wavelength due to temperature variations. There remains a need for more wavelength stable and more reliable athermalized components and especially Bragg gratings. Also there remains a need for a method of attaching a fiber containing a Bragg grating to a temperature compensating substrate that will not crack or slip.

Other passive systems for passive athermalization control involve the use of linear package designs, in which, materials with different coefficients of thermal expansion a connected in parallel to a fiber to provide temperature compensation. In practice the length and compliance of the fiber anchoring points and the joints between the high and low coefficient of thermal expansion materials make it difficult to know and control the exact effective lengths of the package components. Manufacturing difficulties have limited the precision of compensation, yield, and cost of this style of device. For example, accuracy of attachment of the fiber to the package and accuracy of the relative effective lengths of the package materials affects the precision of the compensation for temperature. There remains a need for linear package designs that can be more easily manufactured and yet provide precision compensation.

Accordingly, the present invention addresses the aforementioned desires to provide athermalized components that have increased wavelength stability and reliability. These advantages and others will become apparent from the following detailed description.

BRIEF SUMMARY OF THE INVENTION

The apparatuses and methods of the present invention address the above need for improved athermalized optical components production techniques and systems that include the Bragg gratings. An athermalized optical fiber component assembly including a limiting member, a mounting structure attached to the limiting member, a temperature compensating substrate attached to the mounting structure, and an optical fiber component mounted on the temperature compensating substrate. The movement of the temperature compensating substrate as a function of temperature is constrained by the limiting member. Also, a method for manufacturing an athermalized optical fiber component assembly.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein:

FIGS. 4–7 show embodiments of an athermalized optical component.

FIGS. 8(a–b) show an embodiment the connection of a fiber to a temperature compensated substrate.

FIGS. 9–11 show embodiments of an athermalized optical component.

DESCRIPTION OF THE INVENTION

Figure 1:
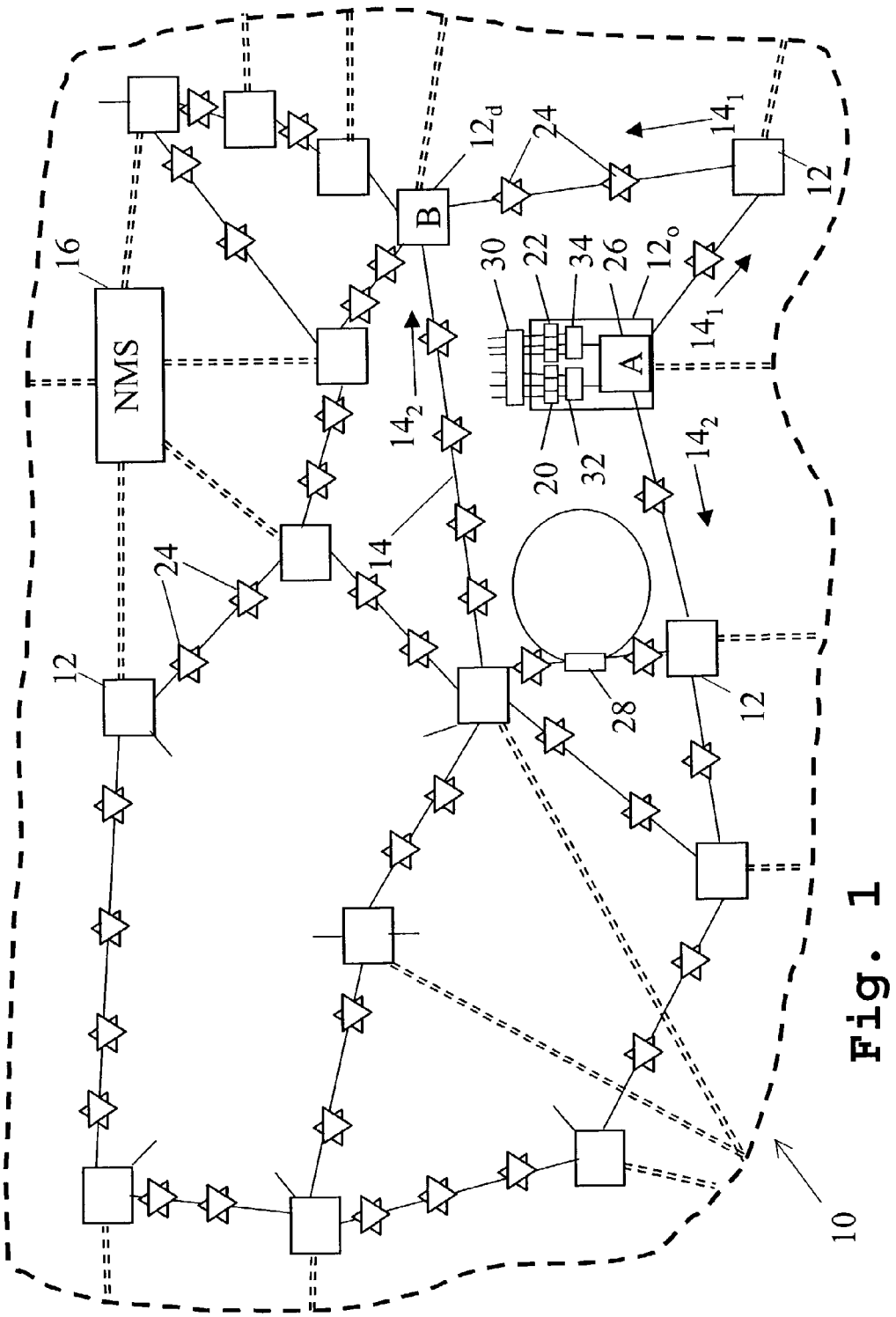
FIGS. 1 and 2 show optical system embodiments.

FIG. 1 illustrates an optical system 10, which includes a plurality of nodes 12 connected by optical communication paths 14. Advantages of the present invention can be realized with many system 10 configurations, topologies, and architectures. For example, an all optical network, one or more interconnected point to point optical links (FIG. 2), and combinations thereof can be configured in various topologies, i.e., rings, mesh, etc. to provide a desired network connectivity.

The system 10 can support one or more transmission schemes, such as space, time, polarization, code, wavelength and frequency division multiplexing, etc., singly or in combination within a network to provide communication between the nodes 12. The system 10 can include various types of transmission media 16 and can be controlled by a network management system 18.

As shown in FIG. 1, optical processing nodes 12 generally can include one or more optical components, such as transmitters 20, receivers 22, amplifiers 24, integrated optical switches 26 and optical add/drop multiplexers 28, and dedicated interfacial devices 30. For example, in WDM embodiments, the node 12 can include optical switches 26 and interfacial devices 30 along with multiple transmitters 20, receivers 22, and associated equipment, such as various monitors, power supplies, system supervisory equipment, etc. The system 10 can include dedicated and integrated optical components. Integrated optical components are all optical components that maintain optical continuity along the communication path.

The optical processing nodes 12 can be configured either statically or dynamically in various topologies via the network management system 18. The deployment of integrated transport optical switches 26, and optical add/drop multiplexers 28 as integrated switching devices in intermediate nodes $12_i$ can provide all optical interconnections between the transmitters 20 and receivers 22 located in non-adjacent origination and destination nodes, $12_o$ and $12_d$, respectively. The use of integrated transport switching devices in the system 10 in this manner provides for distance independent all optical networks, sub-networks, and/or nodal connections.

Various guided and unguided transmission media 16, such as fiber, planar, and free space media, can be used to form the optical communication paths 14. The media 16 supports the transmission of information between originating nodes $12_o$ and destination nodes $12_d$ in the system 10. As used herein, the term "information" should be broadly construed to include any type of audio, video, data, instructions, or other analog or digital signals that can be transmitted.

The transmission media 16 can include one or more optical fibers interconnecting the nodes 12 in the system 10, which typically are composed of various types of silicon based glass or polymers. Various types of fiber, such as dispersion shifted ("DS"), non-dispersion shifted ("NDS"), non-zero dispersion shifted ("NZDS"), dispersion compensating ("DC"), and polarization maintaining ("PM") fibers, doped, e.g. Er, Ge, as well as other dopants, can be deployed as transmission fiber to interconnect nodes 12 or for other purposes in the system 10. The fiber typically can support either unidirectional or bi-directional transmission of optical signals in the form of one or more information carrying optical signal wavelengths $\lambda_{si}$, or "channels". The optical signal channels in a particular path 14 can be processed by the optical components as individual channels or as one or more wavebands, each containing one or more optical signal channels.

Network management systems ("NMS") 18 can be provided to manage, configure, and control optical components in the system 10. The NMS 18 can be connected directly or indirectly to network elements located either in the nodes 12 or remotely from the nodes 12.

Generally, the optical transmitters 20 transmit information as optical signals via one or more signal wavelengths, or signal channels, $\lambda_{S1}$ through the transmission media 16 to optical receivers 22 located in other processing nodes 12. The transmitters 20 used in the system 10 generally include an optical source that provides optical power in the form of electromagnetic waves at one or more optical wavelengths. The optical source can include various coherent narrow or broad band sources, such as DFB and DBR lasers, sliced spectrum sources and fiber and external cavity lasers, as well as suitable incoherent optical sources, e.g., LED, as appropriate. The sources can have a fixed output wavelength or the wavelength can be tunable using various feedback and control techniques, such as temperature, current, and gratings or other components or means for varying the resonance cavity of the laser or output of the source.

Information can be imparted to the electromagnetic wave to produce an optical signal carrier either by directly modulating the optical source or by externally modulating the electromagnetic wave emitted by the source. Alternatively, the information can be imparted to an electrical carrier that can be upconverted, or frequency shifted, to an optical signal wavelength $\lambda_{S1}$. In addition, the information can be imparted using various modulation formats and protocols.

The optical receiver 22 used in the present invention can include various detection and filtering techniques, such as coherent detection, optical filtering and direct detection, and combinations thereof.

Generally speaking, N transmitters 20 can be used to transmit M different signal wavelengths to J different receivers 22. Also, tunable transmitters 20 and receivers 22 can be employed in the optical nodes 12 in a network, such as in FIG. 1. Tunable transmitters 20 and receivers 22 allow system operators and network architects to change the signal wavelengths $\lambda_{S1}$ being transmitted and received in the system 10 to meet their network requirements. In addition, the transmitters 20 and receivers 22 can include various components to perform other signal processing, such as reshaping, retiming, error correction, differential encoding, protocol processing, etc.

Figure 2:
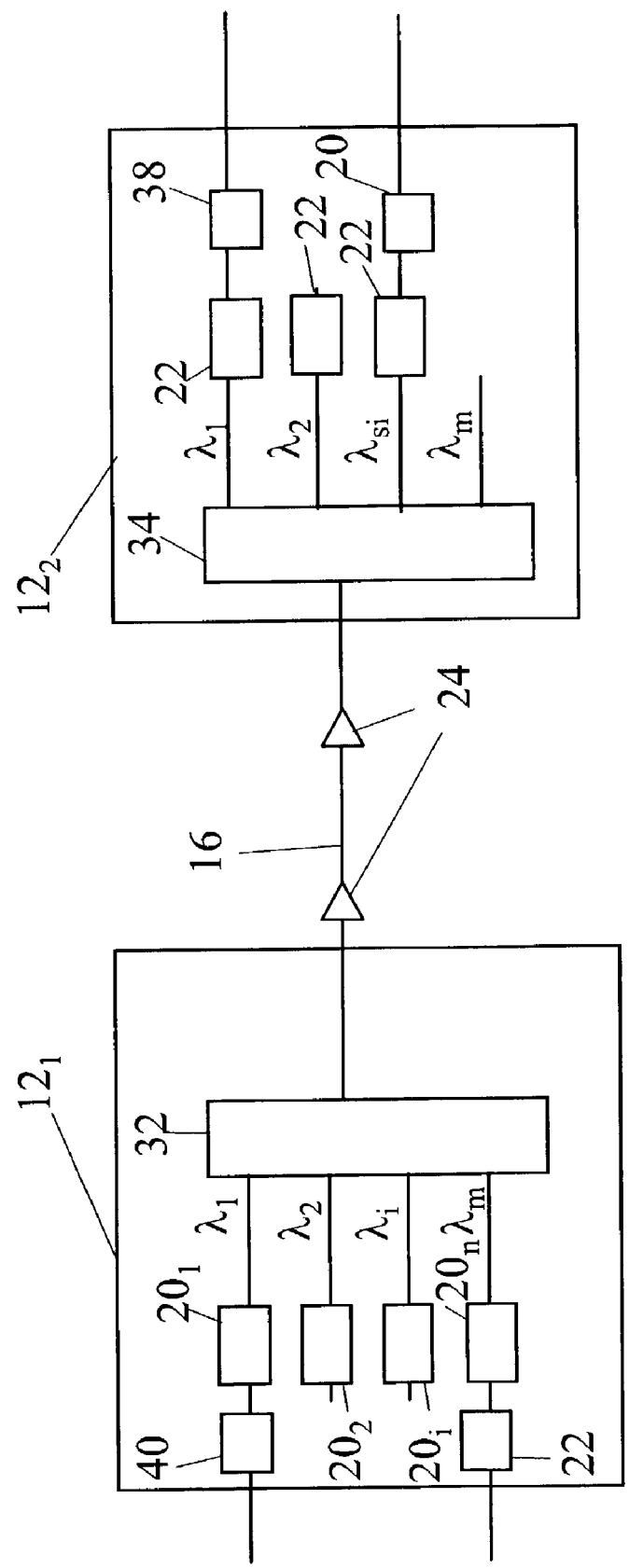

In FIG. 2, it will be appreciated that the transmitters 20 and receivers 22 can be used in WDM and single channel systems, as well as to provide short, intermediate, and/or long reach optical interfaces between other network equipment and systems. For example, transmitters 20 and receivers 22 deployed in a WDM system can be included on a module that includes standardized interface receivers and transmitters, respectively. The use of standardized interfaces supports interoperability with interfacial devices 30 and other transmission and processing systems.

The optical amplifiers 24 can be deployed periodically along optical links 15 to overcome attenuation that occurs in a span of the transmission media 16. In addition, optical amplifiers 24 can be provided proximate to other optical components, for example, at the node 12 as booster and/or pre-amplifiers to provide gain to overcome component losses. The optical amplifiers 24 can include doped (e.g. Er, other rare earth elements, etc.) and non-linear interaction (e.g., Raman, Brillouin, etc.) fiber amplifiers that can be pumped locally and/or remotely with optical energy in various configurations. Other types of optical amplifiers, such as semiconductor amplifiers, can be used in lieu of, or in combination with the fiber amplifiers.

Various types of integrated optical switching devices, such as optical switches 26 and OADMs 28, can be integrated into the nodes 12. The integrated switching devices allow for integrated optical transport switching, adding, dropping, and/or termination of signal channels from multiple paths 14 entirely in the optical domain. The switching devices eliminate the need for receivers 22 and transmitters 20 to perform electrical conversions, as required when using interfacial devices 30, merely to pass the information through intermediate nodes $12_i$. As such, signal channels can optically pass through intermediate nodes $12_i$ between the origin nodes $12_o$ and destination nodes $12_d$ channels, bypassing the need for transmitters 20 and receivers 22 at the intermediate nodes $12_i$. In this manner, the switching devices provide transparency through nodes 12 that allows all optical express connections to be established between non-adjacent origin and destination nodes 12 in a network.

The interfacial devices 30 generally provide dedicated switching and/or signal processing at various points in the system 10. The interfacial devices 30 may include, for example, protocol and bit rate independent devices, such as dedicated optical switches and/or protocol and bit rate dependent electrical switch devices, such as IP routers, ATM switches, SONET add/drop multiplexers, etc. The interfacial devices 30 can be configured to receive, convert, groom, aggregate and provide information in one or more various protocols, encoding schemes, and bit rates to one or more transmitters 20, and perform the converse function for the receivers 22. The interfacial devices 30 also can be used as an input/output cross-connect switch or automated patch panel and to provide protection switching in various nodes 12 depending upon the configuration. The interfacial devices 30 can be electrically connected to the transmitters 20 and receivers 22 or optically connected using standard interface and/or WDM transmitters and receivers, as previously described.

Optical combiners 32 can be provided to combine optical signals from multiple paths into a WDM signal on a common path, e.g. fiber, such as from multiple transmitters 20 or in optical switching devices. Likewise, optical distributors 34 can be provided to distribute one or more optical signals from a common path to a plurality of different optical paths, such as to multiple receivers 22 and/or optical switching devices 26/28.

Figure 3:
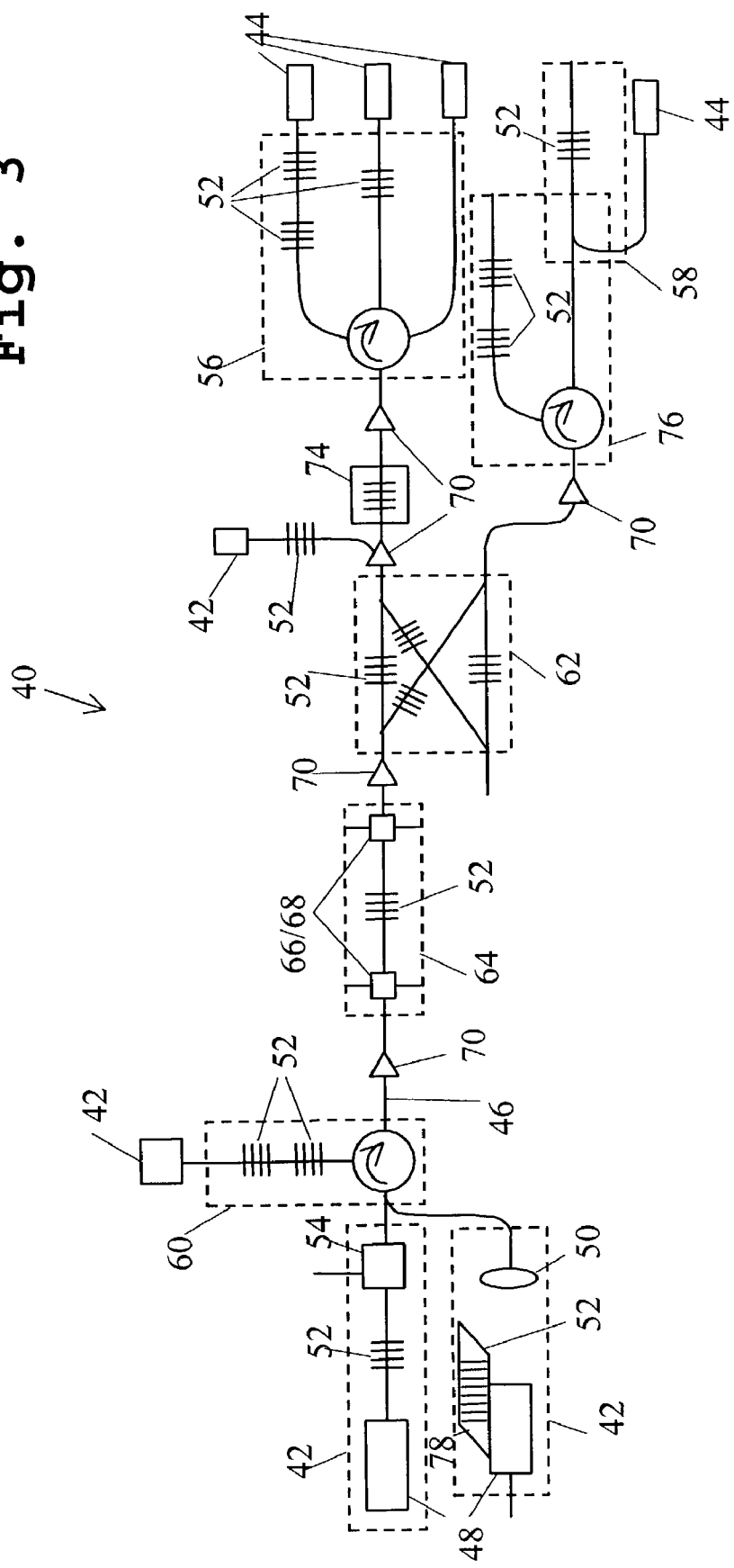
FIG. 3 shows exemplary uses and locations of Bragg gratings in an optical communications network.

FIG. 3 shows an optical communication system 40 including various uses of Bragg gratings 52 in the system. For example, the wavelength emitted by the optical sources 48 can be stabilized or established using Bragg gratings 52 to form an internal and/or external laser cavity. For example, distributed feedback (DFB) and Bragg reflector (DBR) lasers, and other lasers can include Bragg gratings 52 in both the laser cavity and the external cavity. Likewise, Bragg gratings 52 can be used to select wavelengths from broadband sources. A receiver 44 can include Bragg gratings 52 as part of integrated demultiplexers 56 and/or as individual filters to separate one or more wavelengths from a WDM optical signal.

Similarly, the Bragg gratings 52 can be used in a multiplexer 60 for combining multiple optical signals and possibly to spectrally shape the optical signals. Bragg gratings 52 can also be employed in optical switches 62 to switch, add, or drop signal wavelengths between optical paths. The optical switches 62 can be further configured to serve as an add and/or drop device 64. Combiners 66 and distributors 68, such as couplers and circulators, deployed in various combinations in the add/drop device 64 to provide for wavelength reuse, as may be appropriate and is known in the art.

Bragg gratings 52 also can be used in optical amplifier 24 to wavelength stabilize optical pump power provided by a pump laser 72, as well as to gain flatten the amplified signal wavelengths in gain flattening filters 74 and serve as pump reflectors. Dispersion compensating devices or amplified spontaneous emission "ASE" filters 76 including Bragg gratings 52 can be used in the system 40.

For a standard single mode fiber the reflection wavelength variation with temperature can be expressed as:

$$\lambda(T)=\lambda(T_0)+a*T+b*T^2 \qquad (1).$$

T and $T_0$ are ambient and characteristic temperatures respectively, and a and b are linear and non-linear fibre thermal coefficients correspondingly. Typical values for a and b can be measured for different types of fiber. At typical operating temperatures for Bragg gratings 102, the linear term $a*T$ dominates the non-linear term $b*T^2$. Therefore, the Bragg grating reflection wavelength can be athermalized substantially by providing a linear compensation as a function of temperature.

FIG. 4 shows an embodiment of an athermalized optical component according to the present invention. A fiber 101 including a Bragg grating 102 is attached to a temperature compensating substrate 104 using a glass bead 106 and adhesive 108. The temperature compensating substrate 104 is attached to a mounting structure 110. The mounting structure 110 is attached to the housing 112. Limiters 114 are placed inside the housing 112 to provide a fixed space between the temperature compensating substrate 104 and the housing 112. While the embodiment of FIG. 4 includes a Bragg grating, other fiber based optical devices, for example, DFB fiber laser, gain flattening filters, and Mach-Zehnder interferometers, can be athermalized in accordance with the present invention.

Figure 5:
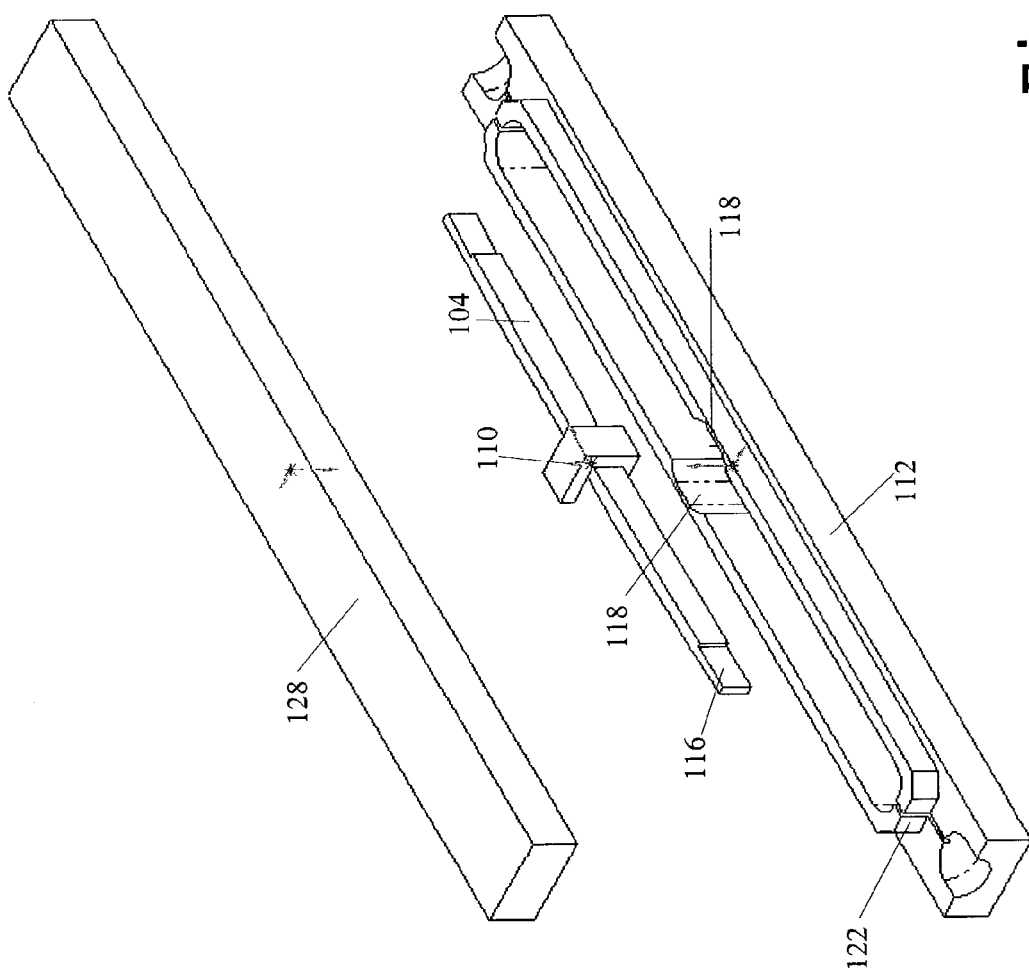

FIG. 5 shows a three-dimensional expanded view of an embodiment of an athermalized optical component according to the present invention. FIG. 5 also shows an embodiment for attaching the temperature compensating substrate 104 to the mounting structure 110.

In FIG. 4, the Bragg grating 102 is attached to the temperature compensating substrate 104. The temperature compensating substrate 104 can be a bimetal member designed to increase or decrease the tension on the Bragg grating 102 as a function of temperature. Such a design can be used to compensate for variation in the reflection wavelength due to the linear term $a*T$ in equation (1) above.

The mounting structure 110 is attached to the temperature compensating substrate 104 as shown in FIGS. 4 and 5. In an embodiment of the invention, the mounting structure 110 is shown as a U-shaped structure and the temperature compensating substrate 104 is attached to the inner surface of the mounting structure 110. The attachment can be performed using various fasteners, such as adhesives, mechanical fasteners, etc. For example, a soft adhesive can used to prevent the mounting structure 110 from constraining the expansion and contraction of the temperature compensating substrate 104. On the other hand, hard attachments constrain the temperature compensating substrate 104, but the temperature compensating substrate 104 can be designed to account for the constraint imposed by a hard connection to the mounting structure 110. Other methods of attaching the temperature compensating substrate 104 to the mounting structure 110 can be used as long as the constraining effects on the temperature compensating substrate 104 coefficient of thermal expansion are accounted for in the design.

In various embodiments, a glass bead 106 and adhesive 108 attaches the fiber 101 to the temperature compensating substrate 104. The present invention uses a combination of a hard and soft attachment to attach the fiber 101 to the temperature compensating substrate 104. First, a glass bead 106 is used to provide a hard and secure attachment. The glass bead 106 is placed over the fiber 101 at an attachment point near the end of the temperature compensating substrate 104. Also, the glass bead can assume many shapes, such as a U-shape or a toroidal shape. The glass bead 106 is melted and then cooled to provide a secure attachment of the fiber 101 to the temperature compensating substrate 104. The glass bead 106 can be directly melted with a heat gun or other well known methods. Alternatively, the glass bead 106 can be indirectly melted by heating the temperature compensating substrate 104. The temperature compensating substrate 104 can be heated to slowly melt the glass bead 106. The controlled slow heating and cooling tends to decrease cracks or other weaknesses from forming in the bond. The glass bead 106 is heated carefully so as to just melt it, without allowing it to boil. The glass bead 106 can be made with an additive to lower the melting point so that the fiber 101 does not melt during the attachment process and to control the coefficient of thermal expansion of the glass bead to match it with fiber. Once the fiber 101 is attached with the glass bead 106, a soft adhesive 108 can be placed over the fiber 101 next to the glass bead 104 on the side of the glass bead 104 opposite the Bragg grating 102. The soft adhesive 108 provides a flexible transition for the fiber 101 from the hard attachment at the glass bead 106 to an exit slot 122 in the housing 112. The soft adhesive 108 allows the fiber 101 to flex a small amount and keeps to bending radius of the fiber large as it continues from the glass bead 106 attachment, but limits this flex and the bending radius to prevent the fiber 101 from breaking due to excessive bending as the fiber moves with the temperature compensating substrate 104 with variations in temperature. The soft adhesive can be replaced with any motion limiting fastener that limits the flex of the fiber.

Once the first side of the fiber 101 is attached, the second side is attached in a similar manner, but the tension of the fiber 101 is controlled during the second attachment to achieve the desired Bragg grating reflection wavelength. The second attachment is performed at a known temperature and tension so that the Bragg grating 102 and temperature compensating substrate 104 are in a known state. The fiber 101 and the tension can be set precisely using closed-loop control by measuring the reflection wavelength of the Bragg grating 102 and then adjusting the tension on the fiber 101 and the Bragg grating 102 until the desired value is achieved. The fiber 101 is then attached with the glass bead 106 as described above. After the process is complete, the reflection wavelength of the Bragg 102 grating is measured. If the reflection wavelength is not at the desired value, the glass bead 106 can be remelted and the tension reset. This process can be repeated, as necessary, until the desired reflection wavelength is achieved. Then the soft adhesive 108 can be applied as described above.

The properties of the temperature compensating substrate 104 can be selected in order to prevent cracking of the glass bead 106 attachment. First, the temperature compensating substrate 104 can have an attachment surface with the same average coefficient of thermal expansion as the glass bead 106. For example, Invar, which has an average coefficient of thermal expansion equal to that of the glass bead 106, can be used as an attachment surface material. In addition, a portion of the second bimetal material opposite the attachment surface near the end of the temperature compensating substrate 104 can be removed forming a notch 116. Alternatively, the temperature compensating substrate 104 can be made with the second bimetal material being shorter than the attachment surface bimetal material. This results in the end of the temperature compensating substrate 104 being made of a single material that does not bend with temperature variation. Thus, there is no bending of the temperature compensating substrate 104 where the glass bead 106 attaches the fiber 101. If this were not the case, the glass bead 106 attachment could crack due to bending of the temperature compensating substrate 104. The notch 116 also benefits the process of attaching of the fiber 101. The notch 116 provides a flat surface when the glass bead 106 is slowly heated and cooled, otherwise, without the notch, the temperature compensating substrate 104 would bend during the heating and cooling causing imperfections in the glass bead 106 attachment. The length of the notch can also be used to control the effective compensation of the temperature compensating substrate 104.

In the present invention, temperature compensating substrates 104 other than bimetal substrates can be used. Also, bimetal substrates using metals other than Invar can be used and even trimetal substrates can be used.

FIG. 4 shows an embodiment including the housing 112 into which the mounting structure 110 with the temperature compensating substrate 104 and fiber 101 is placed. The mounting structure 110 fits into recesses 118 in the housing 112. The recesses 118 allow for some movement of the mounting structure 110 within the housing 112. Two limiters 114 are temporarily affixed to the limiting member 111 inside the housing 112 near the ends of the temperature compensating substrate 104 as shown in FIG. 4. Next, adhesive is placed in the recesses 118 of the housing 112, and the mounting structure 110 is placed in the recesses 118. The recesses 118 are sized to accommodate the size range of the limiters. The ends of the temperature compensating substrate 104 are brought into contact with the limiters 114. The force of the contact between the temperature compensating substrate 104 and the limiters 114 should be minimal in order to minimize bending of the temperature compensating substrate 104. At this point, the characteristics of the Bragg grating 102 can be monitored to ensure that the reflection wavelength has not changed due to the contact force. Once the mounting structure 10 has been placed, the adhesive is allowed to cure. Then, the limiters 114 are removed. Alternatively, the housing 112 may only include the limiting member 111 with a recess 118 for attaching the mounting structure.

The placement of the mounting structure 110 into the housing 112 is done at a controlled temperature to maintain the temperature compensating substrate 104 in a known position. Once the limiters 118 are removed, the resulting gap between the temperature compensating substrate 104 and the limiting member 111 corresponds to a temperature change that will cause the temperature compensating substrate 104 to come into contact with the limiting member 111. Therefore, the size of the limiters 114 sets the temperature limits over which the Bragg grating 102 can operate. Various size limiters 114 can be made in order to manufacture athermalized assemblies with various temperature ranges.

Limiting the range of motion of the fiber 101 in this way has benefits related to the reliability and lifetime of the Bragg grating 102. Limiting the maximum strain placed upon the fiber 101 at extreme temperatures by the temperature compensating substrate 104 reduces the likelihood of the fiber 101 breaking. In addition, limiting the amount of bending of the fiber 101 as it transitions from the glass bead 106 and adhesive 108 attachment point to the exit slot 122 reduces the likelihood of the fiber 101 breaking.

A lid 128 (FIG. 5) can be attached to the housing 112 to provide a semi-hermetic environment for the Bragg grating 102. For example, the lid may be attached with an adhesive or a sealant. After the mounting structure 110 has been placed in the housing 112 with the ends of the fiber 101 extending outside the housing, the housing 112 can be sealed. Adhesive or some other sealant can be placed in the slots 122 in the housing 112 where the fiber exits the housing 112.

In addition, the housing 112 can be filled with a filler to control the impact of humidity and other environmental effects from affecting the various components enclosed in the housing 112. For example, the filler also can provide vibration isolation to the Bragg grating 102. In addition, the filler can be used to provide a more uniform temperature throughout the housing 112. An exemplary filler is a grease such as Krytox® 240 AB grease made by DuPont, but other fillers can be used.

In other embodiments, a spacer 128 (FIG. 6) can be placed in between the fiber 101 and temperature compensating substrate 104 to compensate for the non-linear temperature term in equation (1). In an embodiment of the present invention, the spacer 128 made of thin film, such as silicone rubber or latex rubber, up to 180 μm thick can be placed between the fiber 101 and the temperature compensating substrate 104 to compensate for non-linear variations in Bragg grating reflection wavelength as a function of temperature. The length and the thickness of the spacer 128 determines the effective distance that the fiber 101 sits above the temperature compensating substrate 104. The compensation increases with increasing thickness of the spacer 128. In addition, effective thickness of the spacer 128 can change as a function of temperature if a soft spacer material is used. This shifts the compensation curve resulting in less nonlinear variation of the compensation over the temperature range of interest.

FIG. 6 illustrates another embodiment of the present invention. This embodiment is the same as that in FIG. 4, except the mounting structure 110 has a different geometry. The mounting structure 110 in FIG. 4 has triangular shaped members 124 and 126 that are used to hold the temperature compensating substrate 104. The upper triangular shaped member 124 has an opening where the fiber 101 passes through. This mounting structure 110 has a small contact area with the temperature compensating substrate 104 that reduces the thermal interaction between them as compared to the embodiment of FIG. 4.

FIG. 7 illustrates yet another embodiment of the present invention. In this embodiment, the mounting structure 118 is placed at one end of the housing 112 rather than in the center. The temperature compensating substrate 104 is attached to the mounting structure 118 at one end rather than in the center as in the previous embodiments. This embodiment is otherwise like the previously described embodiments. In addition, the U-shaped mounting structure 118 of FIG. 4 could be used in place of the triangular shaped mounting structure 318 in FIG. 7.

FIGS. 8(a) and 8(b) illustrate other embodiments of attaching the fiber 101 to the temperature compensating substrate 104. The temperature compensating substrate 104 has an indentation 128 for attaching the fiber 101. When the glass bead 106 is melted, it fills the indentation 128. The indentation 128 provides an anchor against the tension on the fiber 101. In FIG. 8(a) the indentation is rectangular, and in FIG. 8(b) the indentation is curved, but the indentation can take any shape.

FIG. 9 illustrates another embodiment of the present invention. Another way to induce the temperature dependant strain uses a temperature compensating substrate 104 that includes two materials; one is a high coefficient of thermal expansion material 130, and the other is a low coefficient of thermal expansion material 132. The two materials 130 and 132 are attached to each other and to a fiber 101 containing a Bragg grating 102 in such a manner to produce a change in strain in the fiber that decreases with increasing temperature. The fiber 101 is attached to the temperature compensating substrate 104 as previously described. This embodiment of the temperature compensating substrate is considered linear because there is no bending of the materials involved but simply linear expansion. The strain applied to the fiber by the temperature compensating substrate 104 is a function of length of the fiber between the attachment points, the length of the two materials, and the coefficient of thermal expansion of the two materials. By choosing appropriate values for the lengths and properties of materials the correct strain temperature relationship to match a given fiber 101 can be obtained.

FIG. 10 shows another embodiment of the present invention. This embodiment is similar the embodiment shown in FIG. 9, but the temperature compensating substrate 104 also includes a third material 134 with a different coefficient of thermal expansion than either the low coefficient of thermal expansion material 132 or high coefficient of thermal expansion material 130. The third material 134 can be a low coefficient of thermal expansion material. Manipulating the relative lengths of the materials 130, 132, and 134 determines the effective overall coefficient of thermal expansion of the temperature compensating substrate 104. The temperature compensation of the temperature compensation substrate can be adjusted after attaching the fiber 101 by machining away some of the overlapping materials 132 and 134 or by otherwise changing the position of the fixing point between the materials 132 and 134.

By choosing coefficients of thermal expansion for materials 132 and 134 arbitrarily close together, it is possible to make the sensitivity to the adjustment mechanism arbitrarily small at the while reducing the total range of adjustment possible. Conversely, increasing the difference in coefficients of thermal expansion for materials 132 and 134 increases the range of adjustment possible while increasing sensitivity of the adjustment. A similar effect can be achieved by choosing a high coefficient of thermal expansion for the third material 134 that is close to the coefficient of thermal expansion for material 130.

FIG. 11 shows direct manipulation of the effective coefficient of thermal expansion of one of the materials 130 or 132 by bonding or otherwise attaching a third material 134 to it. The area of the low coefficient of thermal expansion material 132 under this bonded third material 134 would have an effective coefficient of thermal expansion different than the low coefficient of thermal expansion material 132 alone thus changing the overall compensation achieved. The effective coefficient of thermal expansion obtained depends on the relative compliance of the two sections and the length of the bonded part. After the fiber 101 is attached to the temperature compensating substrate 104, a test reveals the extent of Bragg grating reflection wavelength correction required. Then, the length of the third material 134 required to correct the Bragg grating reflection wavelength can be calculated, and the third material 134 of that length can be applied. A similar effect could be achieved by manipulating the effective coefficient of thermal expansion of the high expansion material 130 by attaching a dissimilar third material 134 to it.

Variations and modifications can be made to the present invention without departing from its scope. Many other variations, modifications, and combinations are taught and suggested by the present invention, and it is intended that the foregoing specification and the following claims cover such variations, modifications, and combinations.

What is claimed is:

1. A method for manufacturing an athermalized optical fiber component, comprising:
    attaching a temperature compensating substrate to a mounting structure;
    attaching a fiber including an optical fiber component to the temperature compensating substrate;
    placing the temperature compensating substrate in contact with a limiter to limit temperature induced movement of the temperature compensating substrate; and,
    attaching the mounting structure to a limiting member in contact with the limiter and then removing the limiter from contact with the limiting member.

2. The method of claim 1 wherein attaching a fiber includes attaching the fiber to the temperature compensating substrate with a first glass bead.

3. The method of claim 2 wherein attaching a fiber includes attaching the fiber to the temperature compensating substrate with a motion limiting fastener.

4. The method of claim 2, wherein attaching a fiber includes:
    placing a strain on the fiber, and
    then attaching the fiber to the temperature compensating substrate with a second glass bead.

5. The method of claim 4, wherein attaching a fiber includes measuring the reflection wavelength of the optical fiber component, melting the second glass bead, and adjusting the strain on the fiber.

6. The method of claim 1, wherein the temperature compensating substrate moves as a function of temperature and the movement of the temperature compensating substrate is constrained by the limiting member.

7. The method of claim 1, further comprising heating the optical fiber component assembly, mounting structure, housing, and limiter to a specified temperature prior to providing a limiter.

8. The method of claim 1, further comprising surrounding the fiber and temperature compensating substrate with filler.

9. The method of claim 1, wherein said providing a limiter includes providing two limiters.

10. The method of claim 1 wherein the optical fiber component is a Bragg grating.

11. An athermalized optical fiber component assembly comprising:
    a limiting member;
    a mounting structure attached to the limiting member;
    a limiter in contact with the limiting member that can be removed after the mounting structure is attached to the limiting member;
    a temperature compensating substrate that moves as a function of temperature attached to the mounting structure; and
    an optical fiber component mounted on the temperature compensating substrate;
    wherein the movement of the temperature compensating substrate as a function of temperature is constrained by the limiting member.

12. The assembly of claim 11 wherein the mounting structure is U-shaped.

13. The assembly of claim 11 wherein the mounting structure further comprises at least one triangular shaped member in contact with the temperature compensating substrate.

14. The assembly of claim 11 further comprising a filler surrounding the fiber and the temperature compensating substrate.

15. The assembly of claim 11 further comprising a glass bead mounting a first end of the optical fiber component on the temperature compensating substrate.

16. The assembly of claim 15 further comprising adhesive next to the glass bead mounting the first end of the optical fiber component on the temperature compensating substrate.

17. The assembly of claim 15 further comprising a second glass bead mounting a second end of the optical fiber component on the temperature compensating substrate while the optical fiber component is strained.

18. The assembly of claim 11 further comprising a spacer wherein the spacer is between the optical fiber component and the temperature compensating substrate.

19. The assembly of claim 11 wherein the temperature compensating substrate is a bimetal having a first and second metal.

20. The assembly of claim 19 wherein the first metal of the bimetal temperature compensating substrate is shorter than the second metal of the temperature compensating substrate.

* * * * *